United States Patent [19]

Evans et al.

[11] Patent Number: 4,675,945
[45] Date of Patent: Jun. 30, 1987

[54] CLIPPING APPARATUS

[75] Inventors: Alfred J. Evans; Raymond H. Misner, both of Raleigh; James A. Gallion, Cary; Melvin L. Harrod, Raleigh, all of N.C.

[73] Assignee: Tipper Tie, Inc., Apex, N.C.

[21] Appl. No.: 693,751

[22] Filed: Jan. 23, 1985

[51] Int. Cl.⁴ .................................. A22C 11/00
[52] U.S. Cl. .................................. 17/33; 17/41
[58] Field of Search .................. 17/33, 41, 42

[56] References Cited

U.S. PATENT DOCUMENTS

| | | | |
|---|---|---|---|
| 4,077,090 | 3/1978 | Frey et al. | 17/41 |
| 4,358,873 | 11/1982 | Kollross | 17/33 |
| 4,417,368 | 11/1983 | Washburn | 17/33 X |
| 4,430,772 | 2/1984 | Michel et al. | 17/33 |
| 4,430,773 | 2/1984 | Becker et al. | 17/33 |
| 4,437,209 | 3/1984 | Duroyon | 17/33 X |
| 4,442,568 | 4/1984 | Petry | 17/33 |
| 4,599,764 | 7/1986 | Knepshield | 17/41 |
| 4,606,379 | 8/1986 | Nausedas | 17/41 X |

FOREIGN PATENT DOCUMENTS

| | | | |
|---|---|---|---|
| 101100 | 6/1962 | Netherlands | 17/33 |
| 976987 | 12/1964 | United Kingdom | 17/33 |
| 598596 | 3/1978 | U.S.S.R. | 17/33 |

*Primary Examiner*—John Sipos
*Assistant Examiner*—Steven P. Weihrouch
*Attorney, Agent, or Firm*—Allegretti, Newitt, Witcoff & McAndrews, Ltd.

[57] ABSTRACT

A sausage stuffing machine includes a cylindrical sausage discharge tube which dispenses sausage material into shirred casing stored on the tube. A clipper is positioned adjacent the end of the tube for sealing the filled casing at desired intervals. A casing brake mechanism is provided at the discharge end of the tube and includes an axially translatable ring which fits over the flared end of the tube to engage the shirred casing.

10 Claims, 22 Drawing Figures

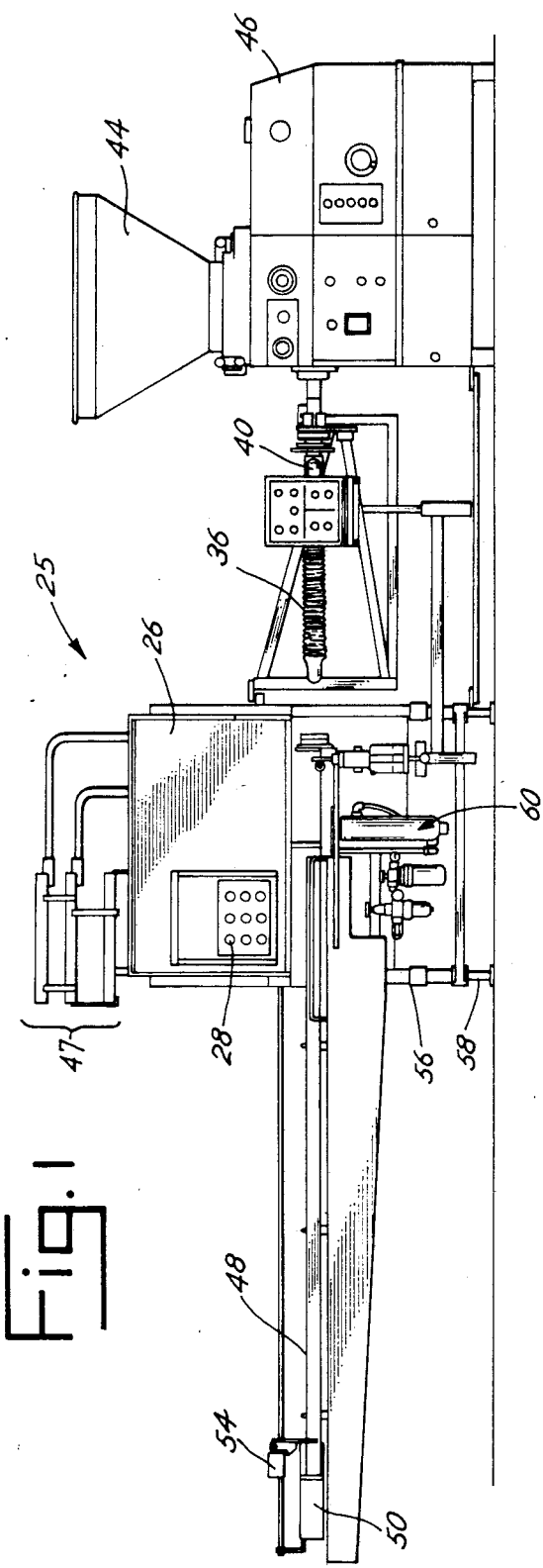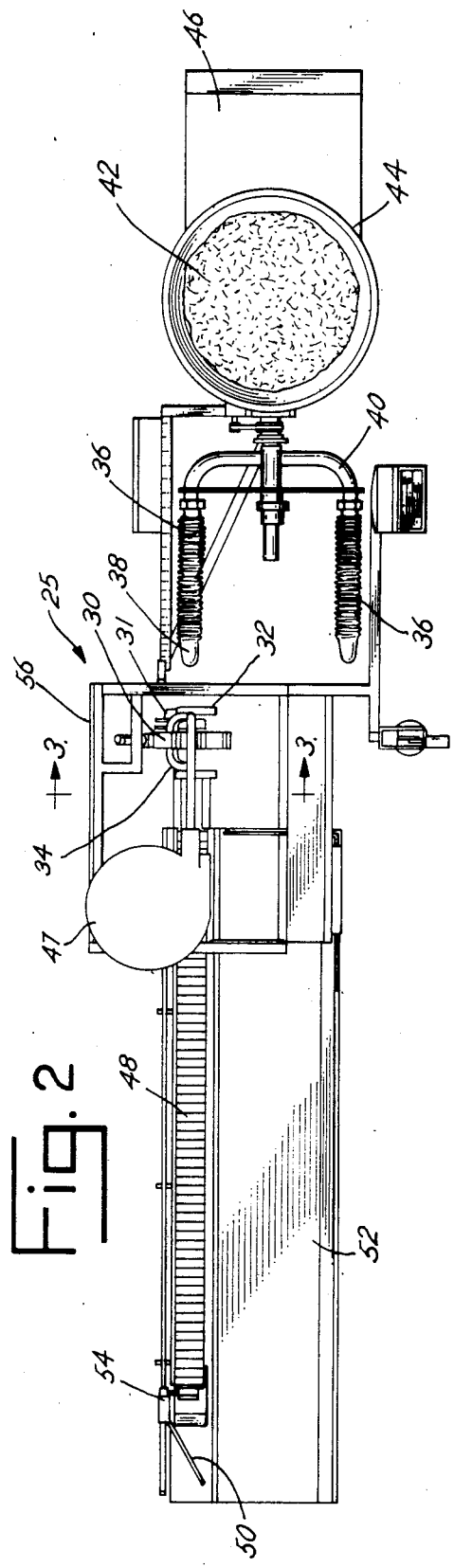

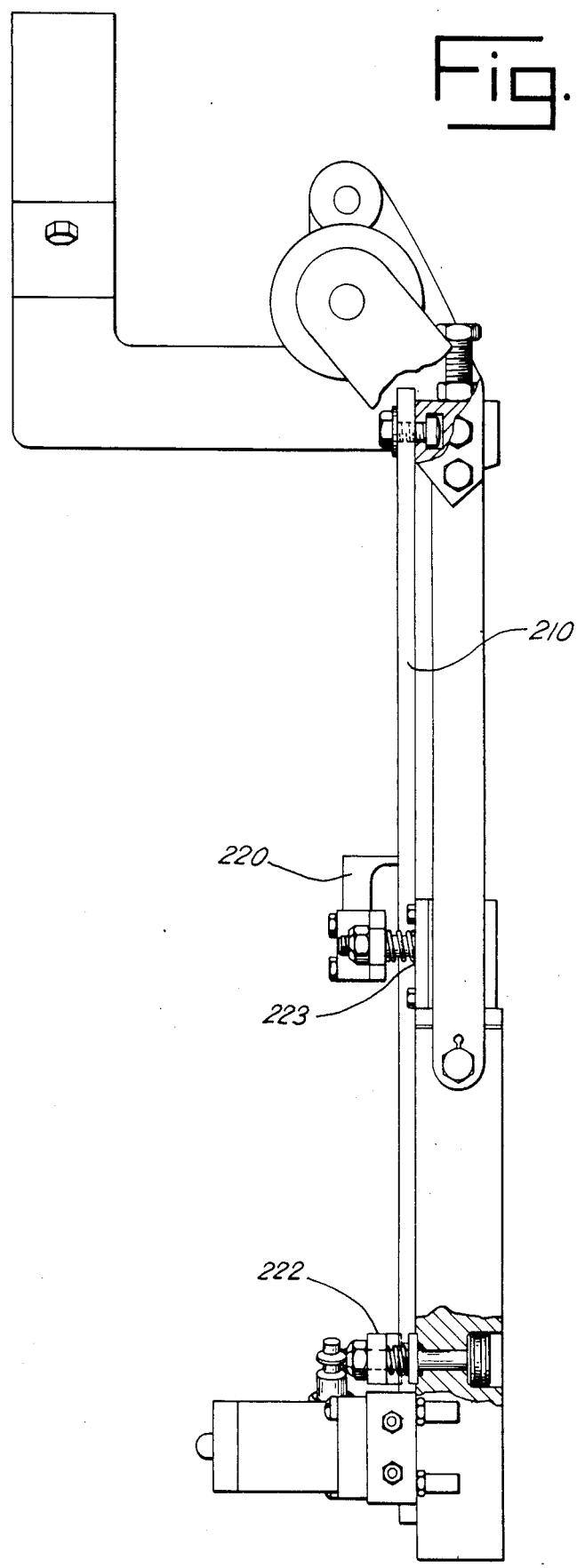

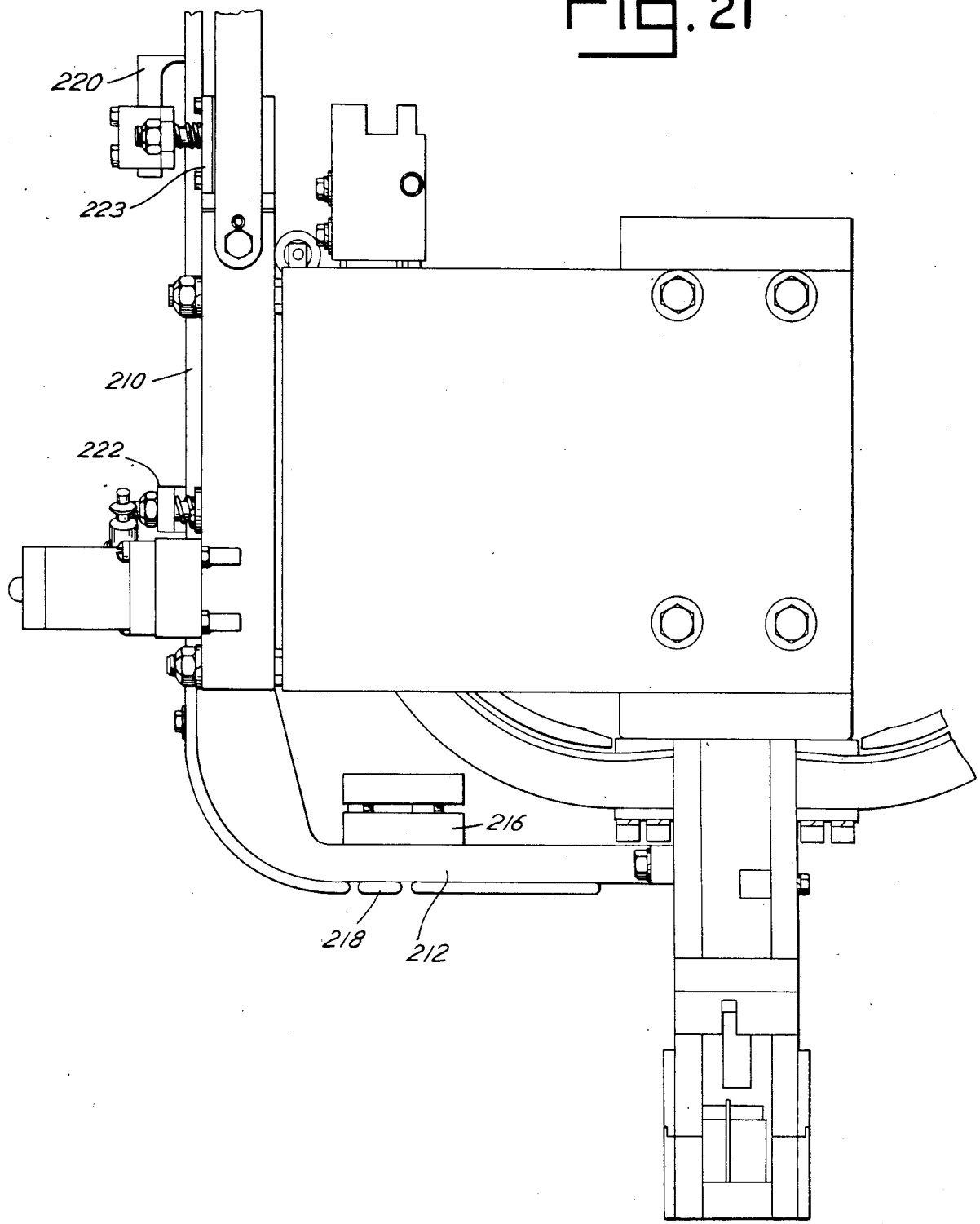

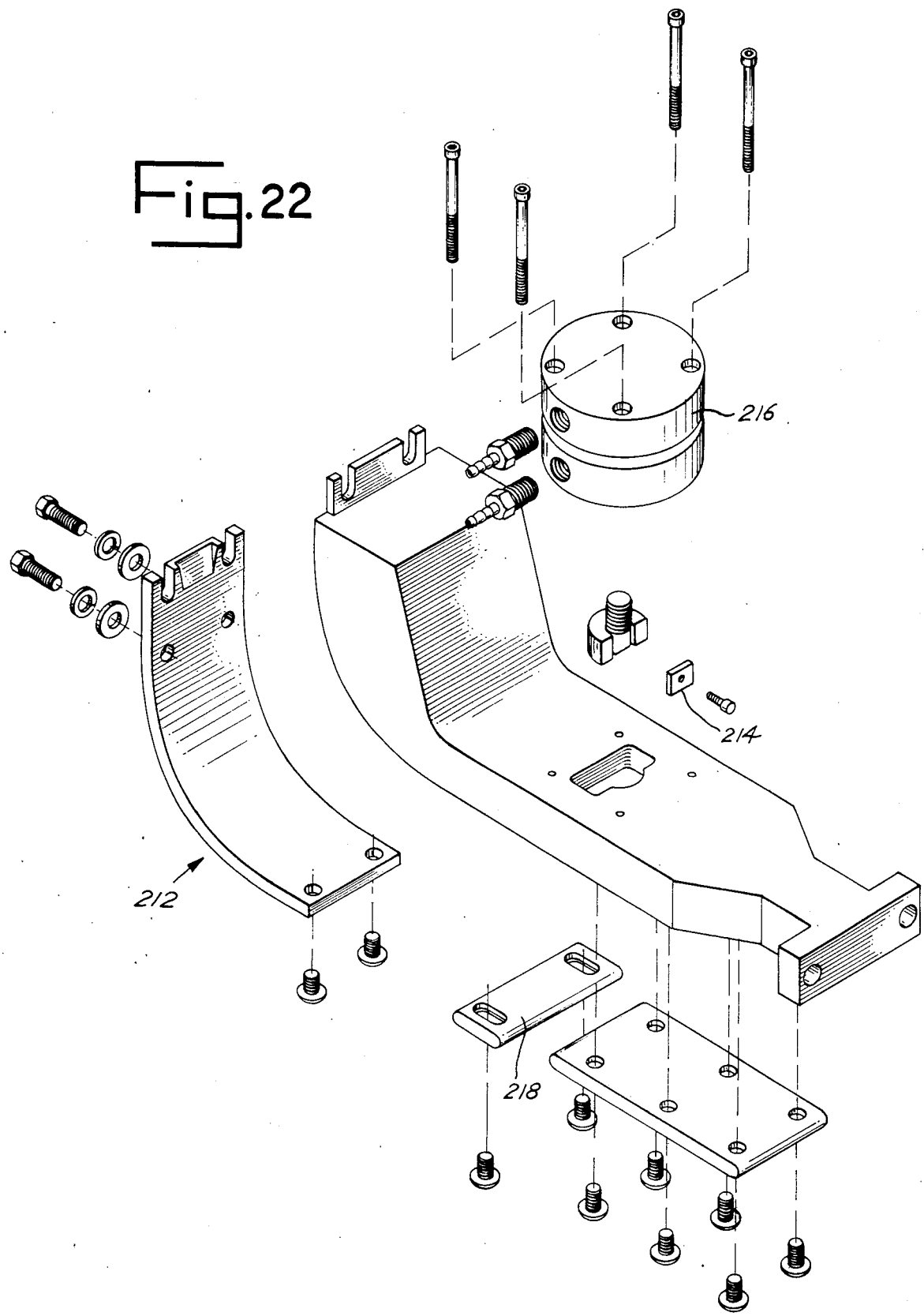

CLIPPING APPARATUS

BACKGROUND OF THE INVENTION

This invention relates to sausage stuffing apparatus. More particularly, the invention relates to apparatus for handling casing and stuffing in cooperation with a stuffing horn, to assist stuffing, and accomplish sausage end clipping, handle loop attachment, conveying and the like.

Mechanized sausage stuffing has existed for years. Sausage casing are shirred on the exteriors of stuffing horns, while stuffing material is pumped through the horns. Both the casings and the stuffing material pass through casing brakes, which control the flow of casing relative to the flow of stuffing material. Product diameter and casing tension are thereby maintained to a high degree of uniformity.

Metal clips sold by Tipper Tie, Inc. and competitors are the standard item for closure of sausage casing ends. The clips are attached by mechanical clippers, to sections of casing void of stuffing material. Handle loops are attached under the clips, for manual handling of the sausages.

Commercial devices in the art include the PolyClip FCA, and the Union Carbide Shirmatic. The Shirmatic device employs two clippers, which are moved to accomplish voiding of the casing for clipping. The PolyClip FCA employs electromechanically driven voider plates, which include two groups of three segments. Each segment has a pivot point.

While the PolyClip FCA and Union Carbide Shirmatic are devices in the art, they lack significantly in speed of operation, simplicity, and versatility.

SUMMARY OF THE INVENTION

An object of this invention is to provide a sausage stuffing and casing handling device which is capable of high capacity, high speed operation; high product uniformity; versatility; reliability; ease of operation; efficiency; and a high level of safety.

A more specific object is to provide a device capable of high uniformity of product diameter, tension and length.

Another object is to provide a device capable of use over wide ranges of product diameter, tension, length, and quantity per unit time.

Still another object is to provide a device capable of use with a variety of stuffing horn equipment.

A further object is to provide a device which is efficient in reducing waste in the length of sausage tails and reducing the quantity of stuffing in the tails.

These and a number of other objects are accomplished by the invention. In a basic aspect, the invention comprises a casing brake, and mounting means for movably mounting the casing brake for movement intermittently to and from a braking position against a stuffing horn, and a releasing position for substantially uninhibited movement of casing through the brake. In a far more complex aspect, the invention comprises a complex, electropneumatic machine which automatically produces sausages at high outputs, in lengths, diameters and tension as desired.

These and a variety of other objects, aspects and advantages to the invention are more fully described in a detailed description of the preferred embodiments of the invention, which follows.

BRIEF DESCRIPTION OF THE DRAWING

FIG. 1 is an overall side elevation view of the invention and typical accompanying equipment;

FIG. 2 is an overall plan view of the invention and the typical accompanying equipment;

FIG. 20 is a side elevation view of the looper portion;

FIG. 21 is a second side elevation view of the looper; and

FIG. 22 is an exploded perspective view of another portion of the looper.

DETAILED DESCRIPTION OF THE PREFERRED EMBODIMENT

Figure 3:
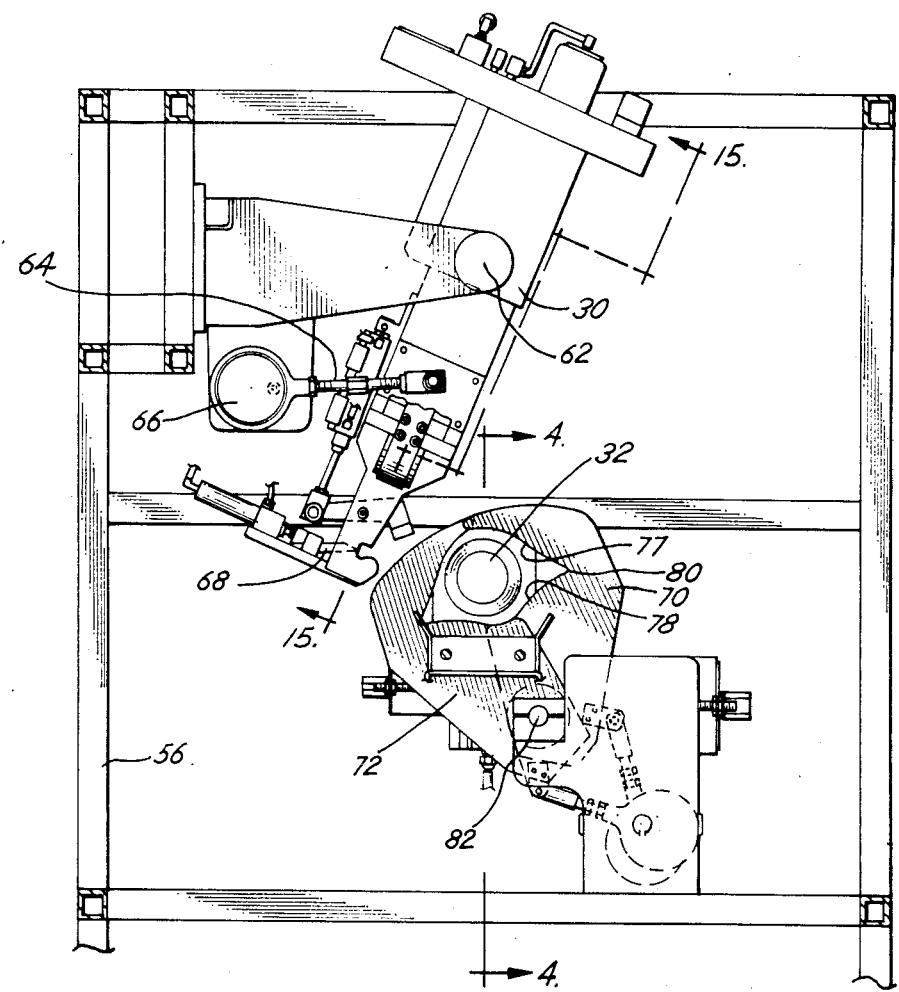
FIG. 3 is a cross-sectional view of the invention taken along line 3—3 in FIG. 2, and revealing the clipper and voiding mechanism of the invention in end elevation.

Referring to FIGS. 1 and 2, the preferred embodiment of the invention is an apparatus or machine 25. A control panel 26 with controls 28 and internal electronic and pneumatic circuitry stands alongside a clipper 30, a looper 31, a casing brake 32, and a voider assembly 34. The casing brake 32 defines the stuffing and casing intake to the machine 25. Casing 36 enters from a horn 38, which may be the only horn or one of several horns on a horn support structure such as structure 40. Stuffing 42 enters from the hopper 44 of a pumping apparatus such as apparatus 46, through the horn 38. The machine 25 is adapted to a variety of horn and pump devices; structure 40 and apparatus 46 are illustrative only.

The casing is stuffed with stuffing in the area of the casing brake 32, as will be described in detail. The stuffed casing progresses through the voider assembly 34. The voider assembly and clipper repetitively act to from sausages of the stuffed casing. Clips and handle loops are fed to the clipper and looper from trays 47.

A power conveyor 48 moves the sausages away, to a diverter 50, to be diverted to a sloped tray 52 for manual removal. Alternatively, if the diverter is not present, the power conveyor can directly convey the sausages onto a rolling rack (not shown) or the like. An overhanging paddle 54 is tripped by the nose or first end of a sausage on the conveyor, to signal the voider assembly and clipper to form the tail or second end of the sausage. The paddle 54 is movable along the conveyor. Alternatively, the control circuitry automatically sizes sausage lengths based on the passage of a time period set by human operator.

The machine 25 has a variety of desirable features. All the foregoing components are supported by a frame 56 atop height-adjustable screw feet 58. Horizontal jack screws provide for horizontal, lateral adjustment of the frame 56 and all components. A safety rope (not shown) encircles the machine 25, for emergency stopping of the machine from any point around the machine. A built-in stair (also not shown) provides ready access to the trays 47. The control panel 26 is hinged to swing away from the position of FIGS. 1 and 2, for access to the voider assembly, clipper and looper. The pneumatic circuitry purges a filter-dryer 60 with intermittent bursts of air for moisture removal.

Figure 8:
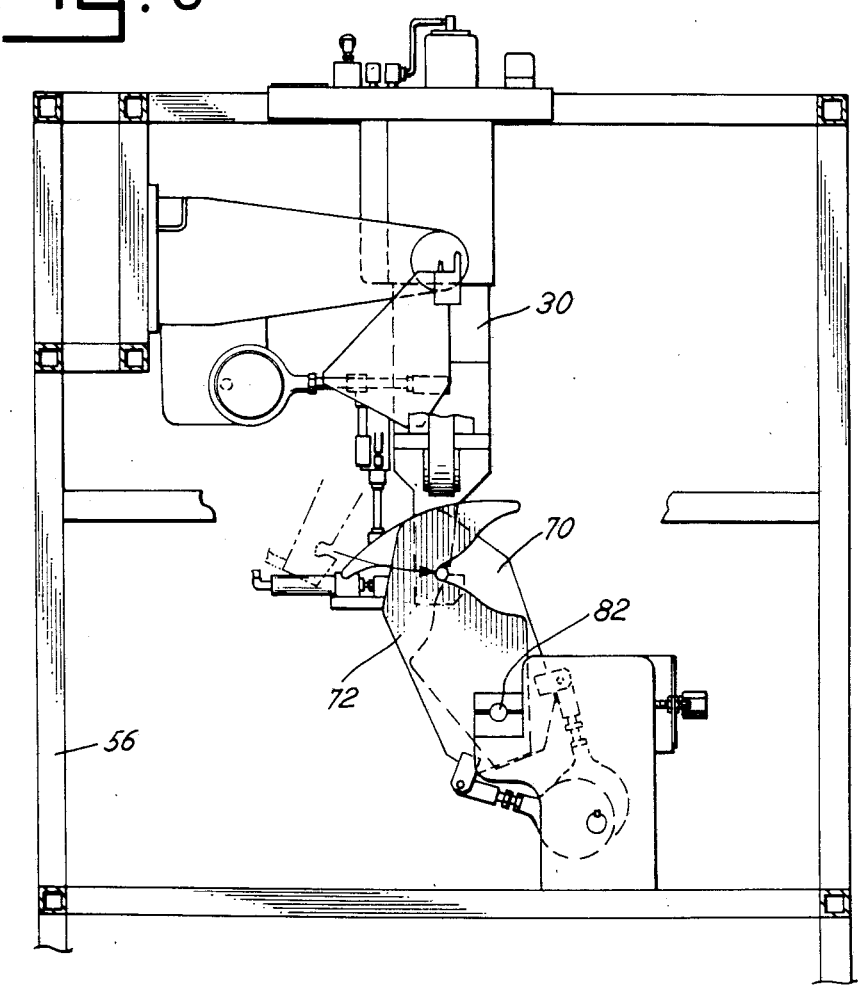
FIG. 8 is a view similar to FIG. 3 demonstrating the invention during clipping.

With this overview of the machine 25 and some features, attention is directed to the detail of the machine. Referring to FIG. 3, the clipper 30 is pivotally, centrally mounted on the frame 56 at pivots 62. A linkage 64 driven by an eccentric 66 pivots the clipper between the retracted position of FIG. 3 and the advanced position of FIG. 8. In the retracted position, the clipper is idle. In the advanced position, the clipper is positioned to simultaneously attach clips to casing, and thereafter to sever casing between the clips with a knife 68.

The voider assembly 34 includes two pairs of voider plates, such as the downstream pair of plates 70, 72 in FIG. 3. The second pair of voider plates, which are the upstream plates 74, 76, are substantially identical to the pair 70, 72, and are shown in cross-section in FIGS. 4–7 and 13–14. Each voider plate 70, 72, 74, 76 includes contoured edges such as 77, 78 of plate 70, which form a V-cut with a semi-circular root 80 within each plate. The plates 70, 72, 74, 76 are pivotally mounted on a shaft 82 for pivoted movement about the shaft to and from the retracted position of FIG. 3 and the advanced position of FIGS. 8 and 12. In the retracted positions of the plates, the edges 77, 78 of each pair of plates form a large, closed outline, double V-shape opening. In the advanced positions, the roots 80 of each pair of plates are adjacent each other, to form a small, circular opening. The size of the opening in the retracted positions of the voider plates is such that casing passes uninhibited through the plates during stuffing of the casing, as in FIG. 4. The casing is squeezed void of stuffing between the roots 80 in the advanced positions, as in FIG. 5.

In addition to being pivotable about the shaft 82, the downstream pair of voider plates 70, 72 are axially movable toward and away from the upstream pair 74, 76. Comparing FIGS. 6 and 7, the plates 70, 72 are slidable along the axis of the shaft 82. With the voider plates in the advanced position, the downstream voider plates move away from the upstream plates to void a length of casing for action by the clipper 30, as in FIG. 8.

Returning to FIG. 3, the casing brake 32 is upstream of the voider assembly 34. The voider assembly is centered on the axial centerline of the casing brake, such that in the advanced positions of the voider plates, the small openings formed by the roots 80 of the plates lie along the axial centerline of the casing brake.

Figure 10:
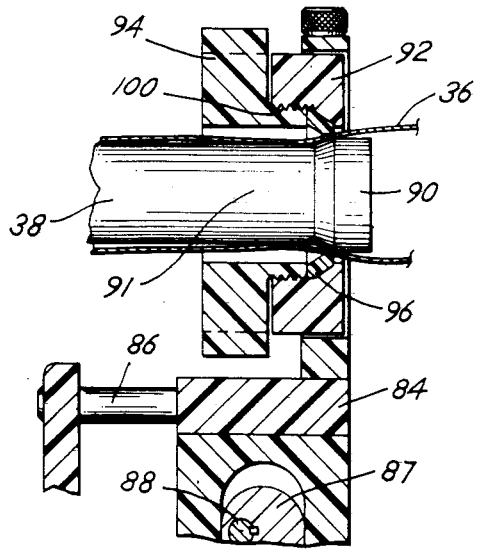
FIG. 10 is a cross-sectional view of the casing brake taken along line 10—10 in FIG. 9, with the casing brake and stuffing horn in positions providing tension on the casing during stuffing.
Figure 11:
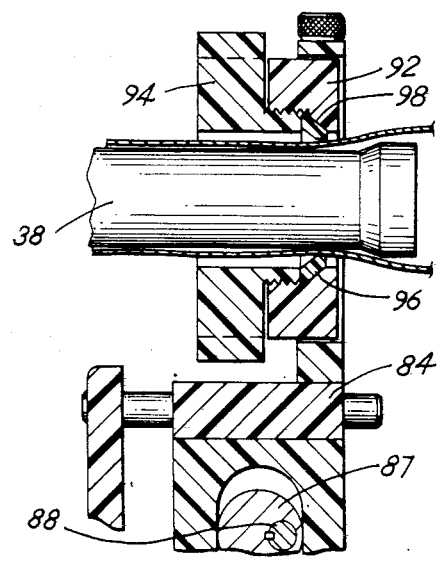
FIG. 11 is a view similar to FIG. 10 with the casing brake and stuffing horn in positions of no tension on the casing during voiding and clipping.

The casing brake 32 is adapted to temporarily release tension in the casing during the action of the voider assembly. Referring to FIGS. 10 and 11, the casing brake 32 includes a base 84 slidably mounted on ways 86. The ways 86 are axially aligned with the axial centerline of the brake 32. An eccentric 87 on an intermittently driven shaft 88 drives an eccentric follower 89 affixed to the base 84. The eccentric thereby drives the base 84 and the total brake 32 along the ways 86.

The horn 38, modified according to the invention, includes an end portion 90 enlarged relative to a non-end portion 91 of the horn 38 adjacent the end portion 90. The casing brake 32 further includes an upright, first brake member 92 affixed atop the base 84, a second brake member 94, and a flexible Delrin ring 96. The first member 92 forms a frusto-conical surface 98 for adjustable seating of the ring 96, and the second member 94 adjustably squeezes the ring 96 against the surface or seat 98. In a braking position of the brake 32, as in FIG. 10, the ring 96 is axially adjacent the horn end portion 90. The ring 96 and end portion 90 define a tight annular casing gap through which casing must travel to enter the machine 25. The tight gap brakes movement of the casing into the machine 25, for controlled movement. In a releasing position of the brake, the ring 96 is axially adjacent the reduced diameter non-end portion 91, and not adjacent the portion 90. In the releasing position, the gap between the ring 96 and portion 91 is sufficiently large that the casing 36 moves uninhibited through the brake 32. Movement of the casing brake 32 to and from the braking and releasing positions is coordinated with movement of the voider assembly.

Figure 9:
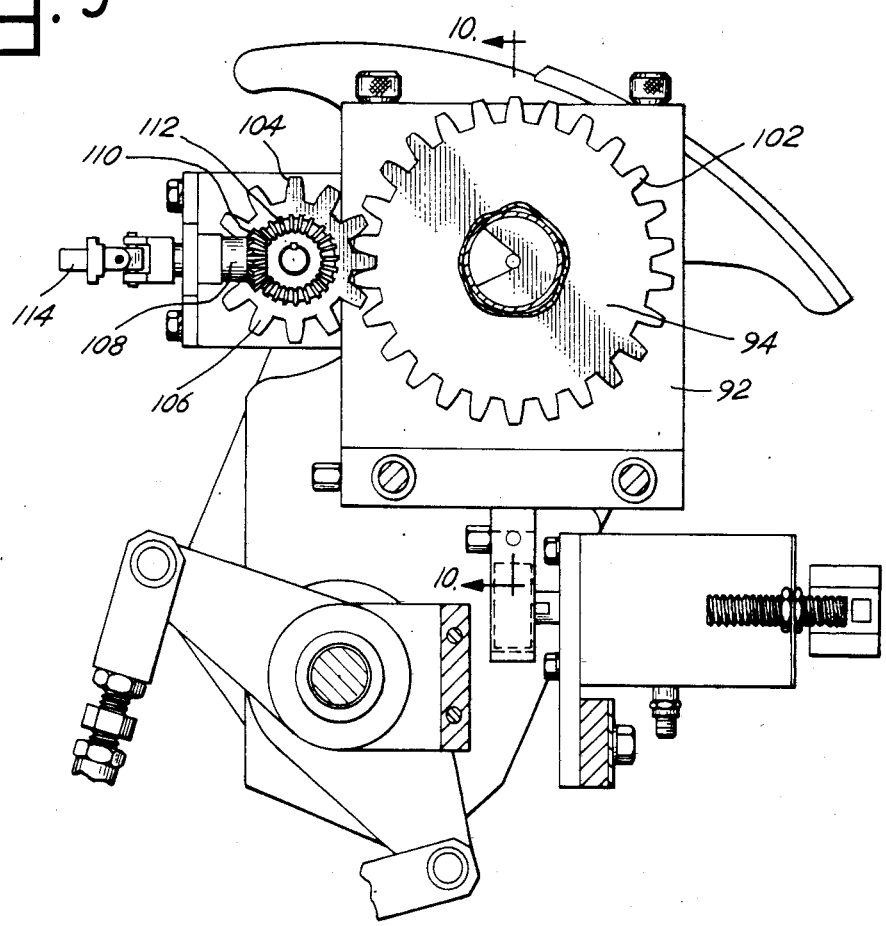
FIG. 9 is a detail cross-section view of invention taken along line 9—9 in FIG. 7, and showing a mechanism for adjusting a casing brake of the invention.

Before returning to the voider assembly, the tension against movement of the casing created by the casing brake 32 is adjustable as in FIGS. 9 and 10. Member 94 is adjustably mounted on member 92 through cooperating screw threads 100. The periphery of member 94 includes gear teeth 102 meshing with spur gear teeth 102 on an adjustment spur gear 106. The gear 106 is driven by a second spur gear 108 through meshed teeth 110, 112. A manually turned linkage 114 drives the gears 108, 106, and the member 94. Movement of the member 94 farther into the member 92 tightens the ring 96 against the horn portion 90. Movement out of the member 92 loosens the ring 96.

Figure 4:
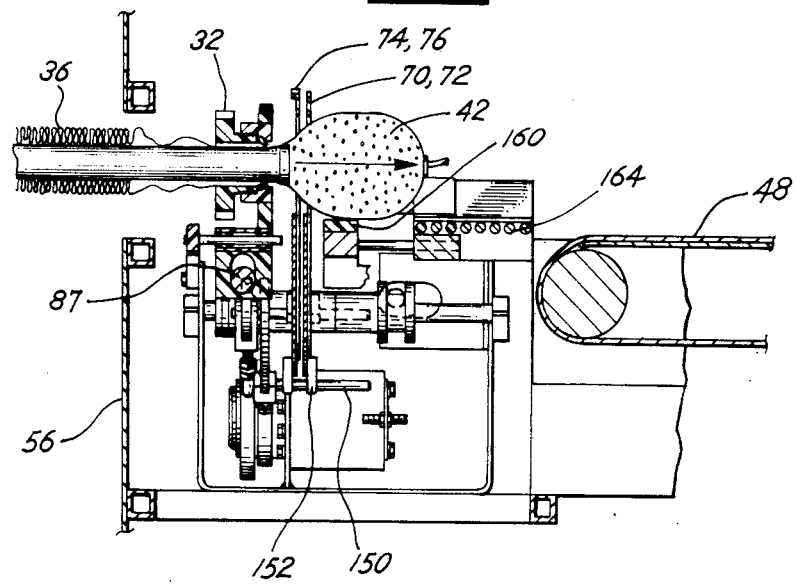
FIG. 4 is a cross-sectional view taken along line 4—4 in FIG. 3 and demonstrating operation of the invention in a stuffing stage of operation.

Returning to the voider assembly 34, motion of the assembly 34 and the brake 32 are coordinated through the sequence of motions of FIGS. 4–7. Referring to FIG. 4, stuffing of casing begins and continues with a leading end of the casing clipped. The casing brake is in a braking position. The pairs of voider plates are axially close together, and pivotably retracted. Stuffing material is pumped through the horn 38. The casing moves toward the conveyor 48 under the pressure of the stuffing material acting against the tension created by the casing brake 32.

Figure 5:
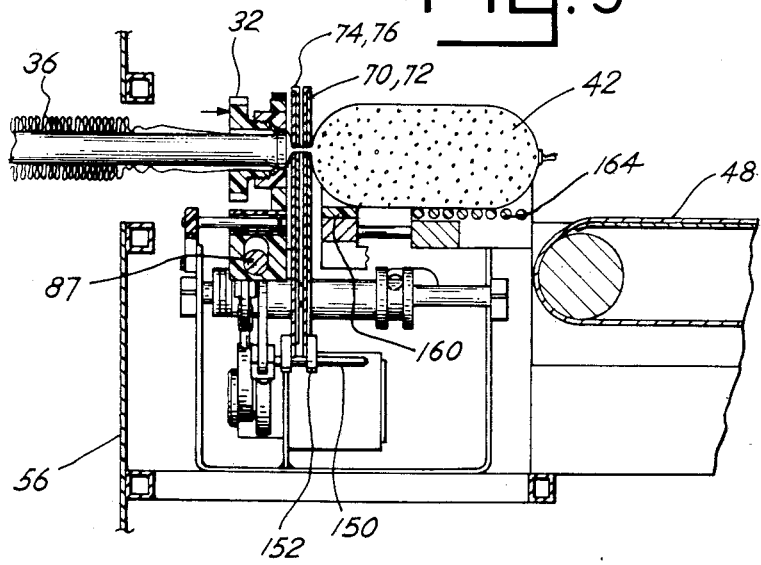
FIG. 5 is a view similar to FIG. 4 demonstrating the invention in a first voiding stage of operation.

When the stuffed casing reaches a desired length, as for example in FIG. 5, the machine 25 progresses from the stuffing stage of operation to a first voiding stage, as in FIG. 5. With the casing brake remaining in braking position, the voider plates advance, creating a trailing end to the stuffed casing, and thereby defining a sausage.

Figure 6:
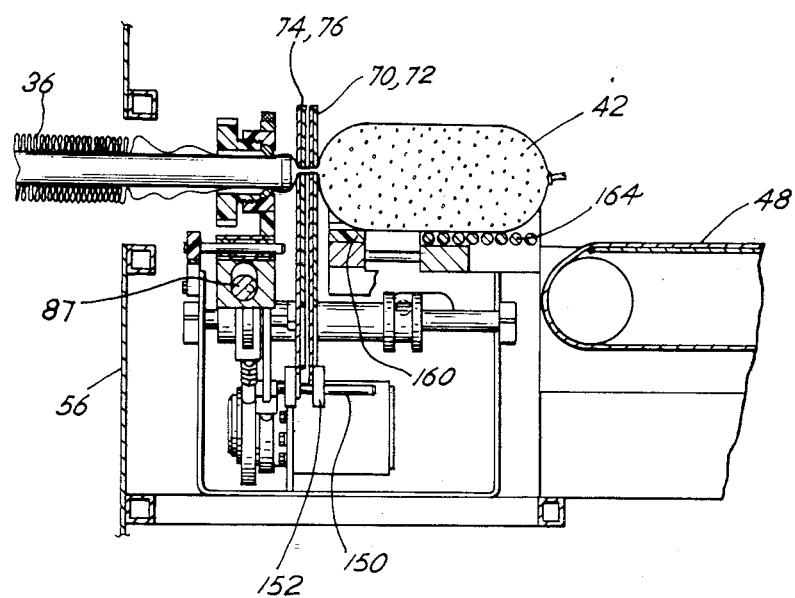
FIG. 6 is a view similar to FIG. 5 demonstrating the invention in a second voiding stage of operation.

The machine then progresses to a second voiding stage of operation, as in FIG. 6. The casing brake moves to the releasing position, under the action of eccentric 87 and shaft 88.

Figure 7:
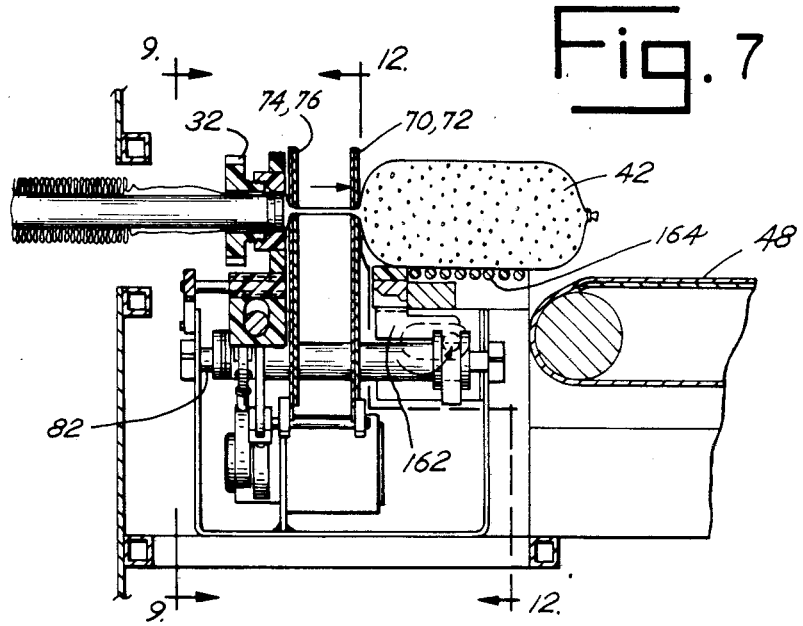
FIG. 7 is a view similar to FIGS. 4 and 5 demonstrating the invention in a third voiding stage of operation.

In a third voiding stage of operation, the downstream voider plates move axially downstream from the upstream plates, as in FIG. 7. A voided length of casing is exposed for action of the clipper 30 and looper 31.

As desired, the machine 25 may be adjusted to draw casing from the horn during axial movement of the plates 70, 72. Alternatively, no further casing is drawn. Instead, the stuffing is packed more tightly into the stuffed casing, as a tail of the stuffed casing is voided. The alternative desired is selected by adjustment of advanced positions of the voider plate pairs. A grip of the downstream pair on the casing tighter than the grip of the upstream pair results in casing being drawn from the horn. A tighter grip of the upstream pair causes packing.

Figure 12:
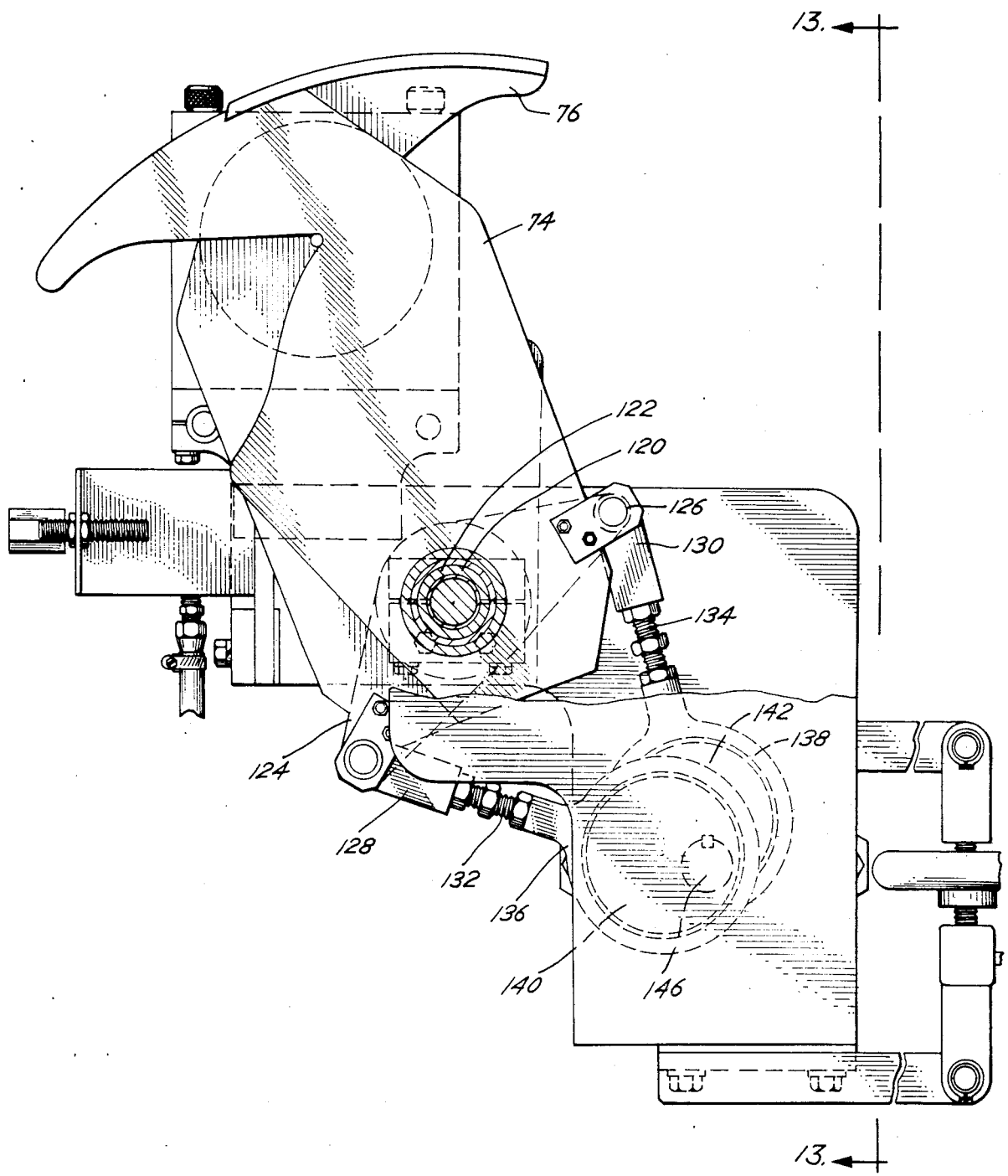
FIG. 12 is a view similar to FIG. 8 enlarged to reveal detail of the voiding mechanism.

Attention is now directed to the driving linkages of the voider plate pairs. Referring to FIG. 12, a first plate 74 of the upstream voider plate pair is attached to an end of a first concentric collar 120 on the shaft 82. The second plate 76 is attached to an end of a second concentric collar 122, also on the shaft 82. The first collar 120 is fitted through the second collar 122, and extends axially beyond the second collar at both ends of the collars.

Figure 13:
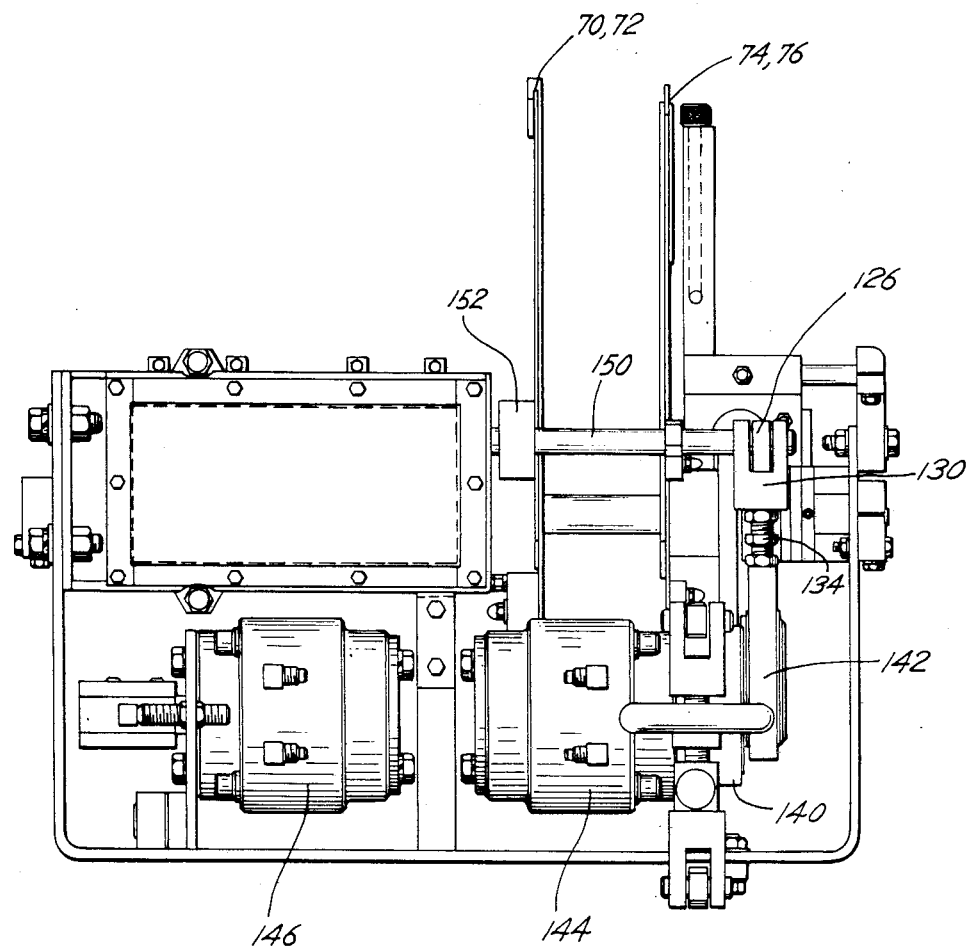
FIG. 13 is a side elevation view of the voiding mechanism, taken along line 13—13 in FIG. 12.

A first lever 124 is attached to the first collar remote from the plates 74, 76; a second lever 126 is attached to the second collar, also remote from the plates 74, 76. Clevis pins 128, 130 pivotably link the levers 124, 126 to adjustable tie rods 132, 134 and thereby to cranks 136, 138. The cranks 136, 138 are driven in rotation by eccentrics 140, 142. Referring to FIG. 13, pneumatic actuators 144, 146 drive the eccentrics 140, 142 through a shaft 146 to which the eccentrics 140, 142 are keyed.

Figure 14:
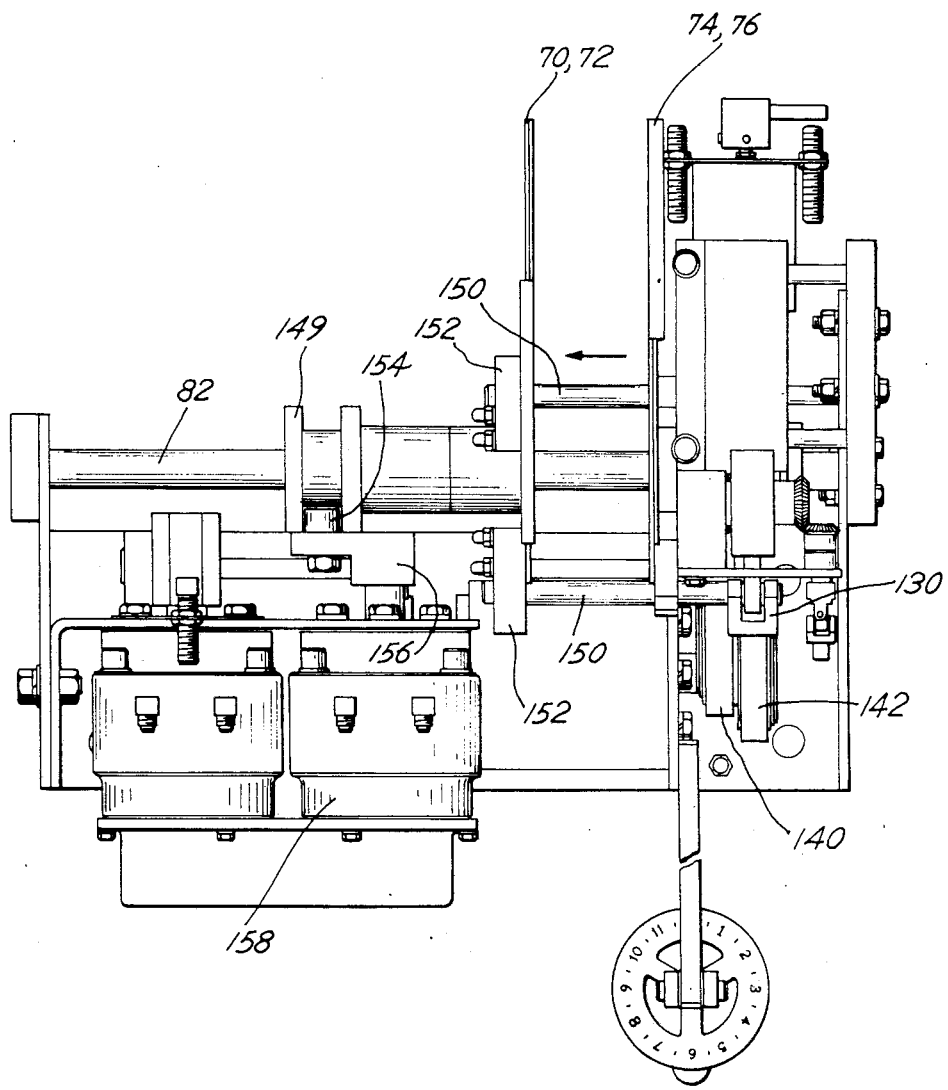
FIG. 14 is an enlarged plan view of the voiding mechanism of the invention.
Figure 15:
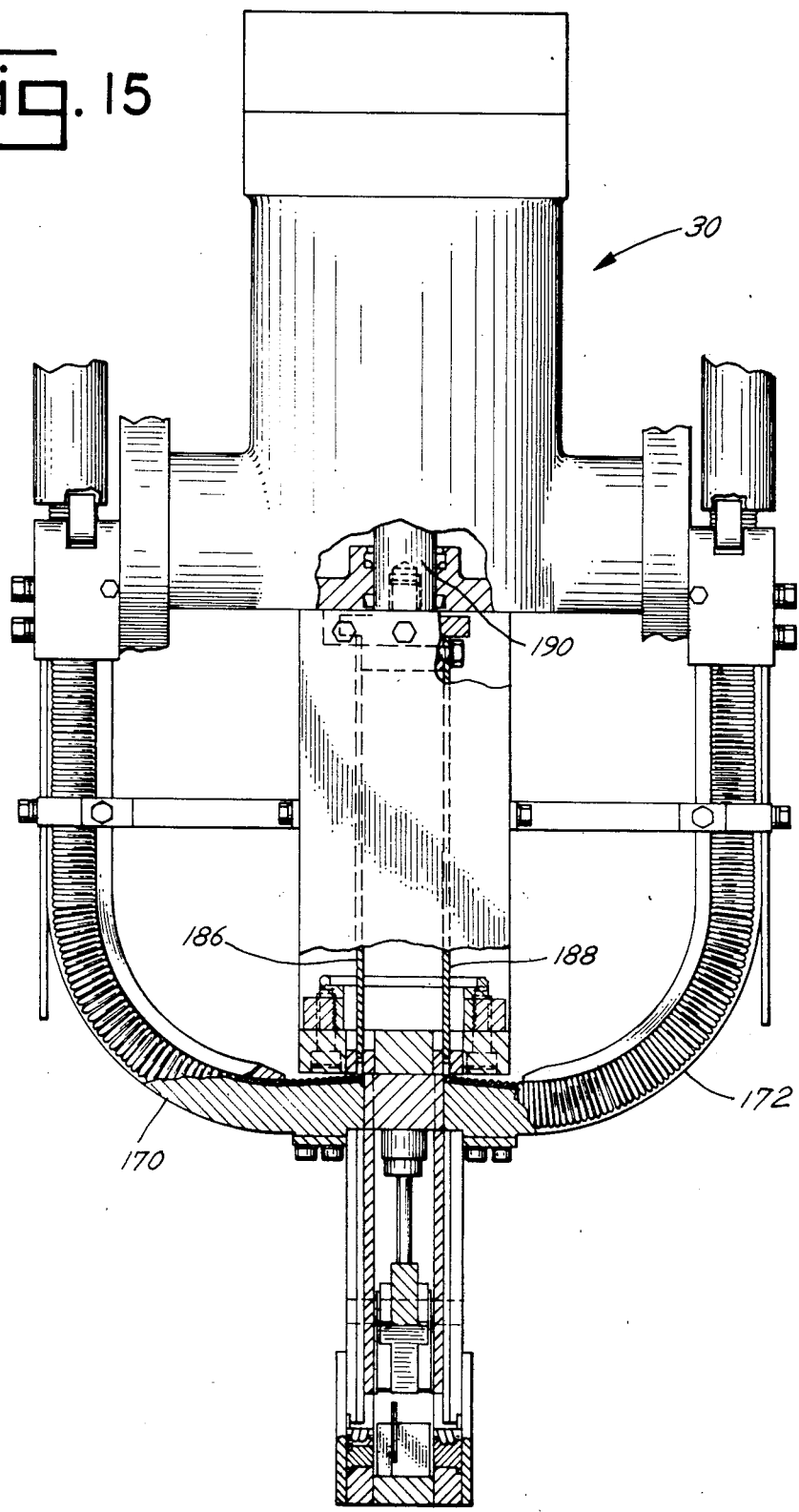
FIG. 15 is a side elevation view of the clipper of the invention, taken along line 15—15 in FIG. 3.

The downstream voider plates 70, 72 are moved laterally to the advanced and retracted positions by the upstream plates 74, 76. The downstream voider plates are moved axially toward and away from the upstream plates by an actuator driven collar 149 on the shaft 82. Referring to FIGS. 13 and 14, an axially extending rod 150 is affixed to each plate 74, 76. A rod follower 152 is affixed to each plate 70, 72, and is slidably mounted along a rod 150. The followers are free to move axially along the rods 150 and driven in lateral movement by the rods 150.

The collar 149 is slidably mounted on the shaft 82, as in FIG. 14, and attached to the plates 70, 72. A crank pin 154 on a crank 156 fits within an annular recess in the collar 149. The crank is driven in rotation by a pneumatic actuator 158. Engagement of the pin 154 with the collar 149 throughout rotation of the pin 154 causes reciprocal sliding movement of the collar 149 and plates 70, 72.

Returning to FIGS. 4-6, a support 160 moves axially with the voider plates 70, 72. A link 162, in FIG. 7, links support 160 to the collar 149 for movement with the collar. A pair of guide rods 164 carry the weight and guide the movement of the support 160. During the initial stuffing of each sausage, the support 160 supports the leading end of each sausage as it passes beyond the voider plate pairs. The leading end moves from the support 160 to a fixed conveyor segment 164 and thence to the power conveyor 48. The conveyor 48 is speed matched to the process of stuffing, to assist maintenance of uniformity in the diameter and tension of the sausages.

Upon completion of the stuffing of each sausage, the support 160 moves with the voider plate pair 70, 72 to support the trailing end of the sausage during clipping.

The structure and function of the casing brake 32, voider assembly 34 and associated components are now described in detail. The centrally pivoted clipper 30 pivots between the axially separated pairs of voider plates to clip the casing as mentioned above. Referring to FIGS. 15-18, the clipper 30 receives the casing in the gap 173. The clipper 30 futher receives clips from two clip guides 170, 172. Clips reach the clip guides through two clip tubes 174, 176, as in FIG. 17. The clip tubes are pivotably attached to the clipper, and extend upward to two high capacity clip trays 178, 180 of the trays 47. The tubes 174, 176 are jogged upward and downward as the clipper 30 advances and retracts. Two slotted brackets 182, 184 loosely receive enlarged collars on the tubes 174, 176. The collars and slots accommodate jogging of the tubes 174, 176 while maintaining positioning of the tubes relative to the trays. The clip guides 170, 172 terminate adjacent two clip drives 186, 188, shown in FIG. 15, which drive a pair of clips simultaneously and side-by-side. The drivers are powered and reciprocated by a single pneumatic actuator 190. Clips are driven toward the partial dies 192, 194 as a pneumatic actuator 196 pivots die complements on a bar 198 into position adjacent the dies 192, 194. The completed dies form the clips to seal the trailing end of a stuffed sausage and simultaneously seal the beginning end of a sausage to be stuffed.

Figure 16:
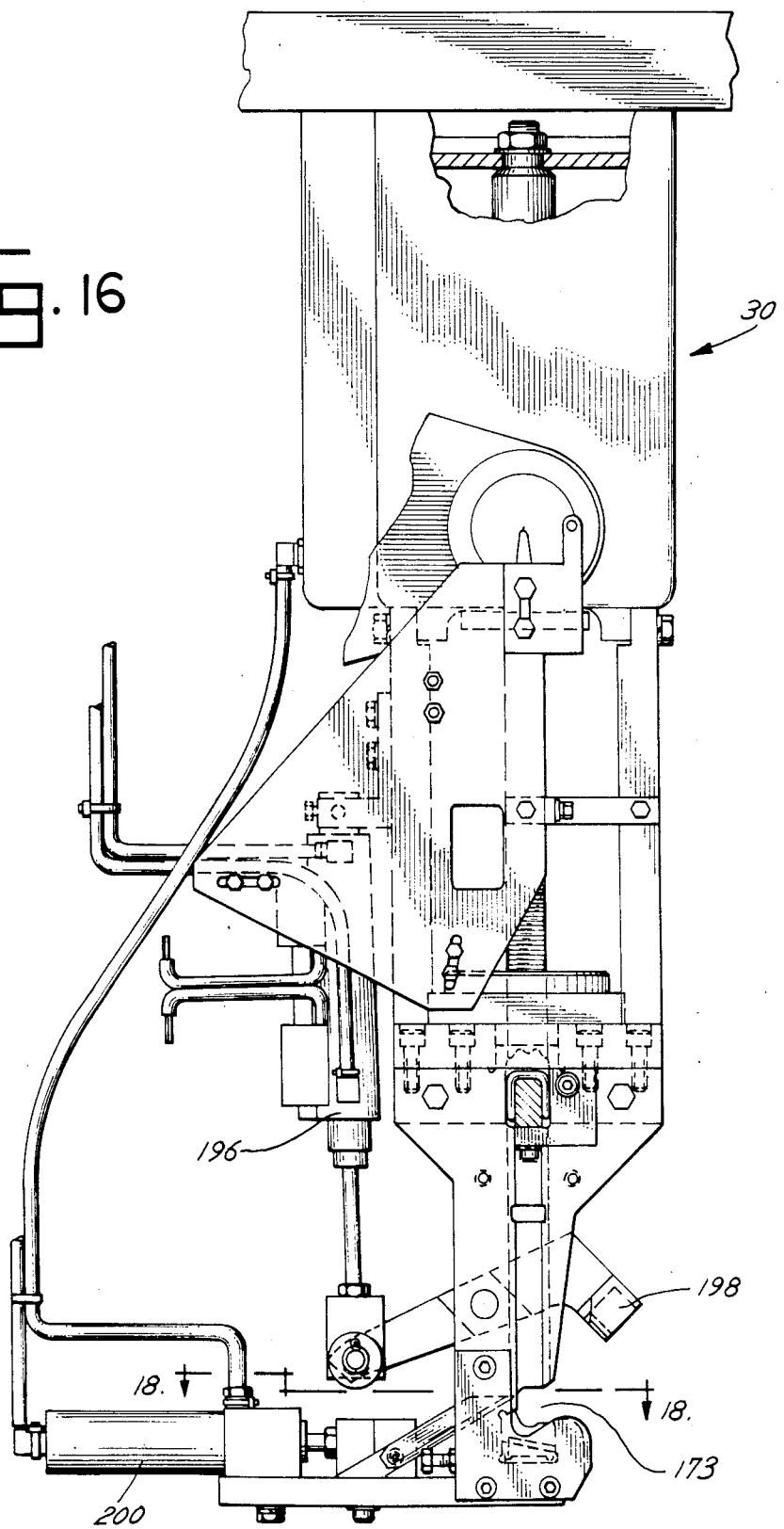
FIG. 16 is an end elevation view of the clipper.
Figure 17:
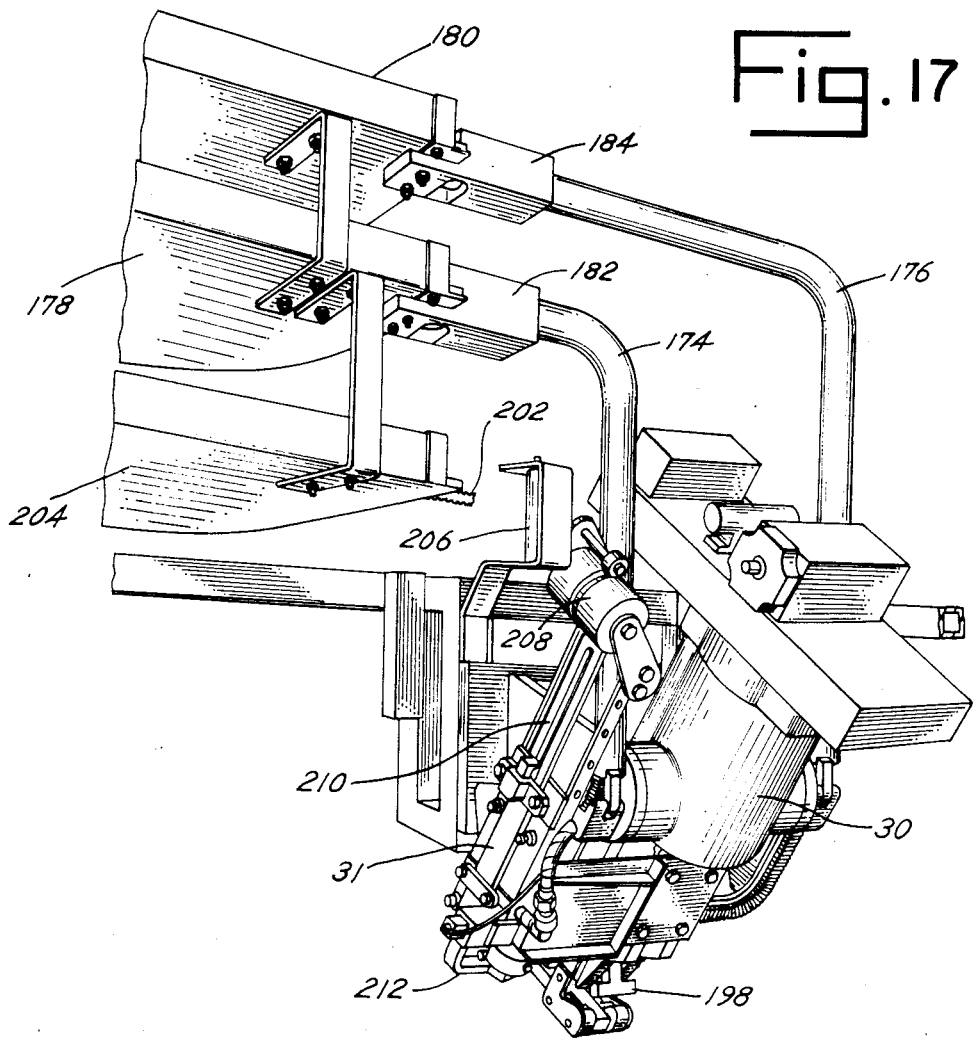
FIG. 17 is a perspective view of the clipper, looper, clip and loop trays and clip and loop feed arrangement.
Figure 18:
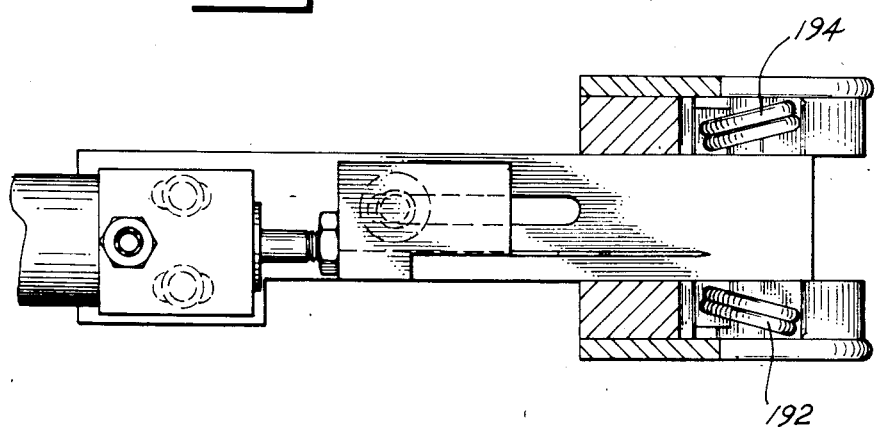
FIG. 18 is a cross-sectional view of the clipper die and knife, taken along line 18—18 in FIG. 16.
Figure 19:
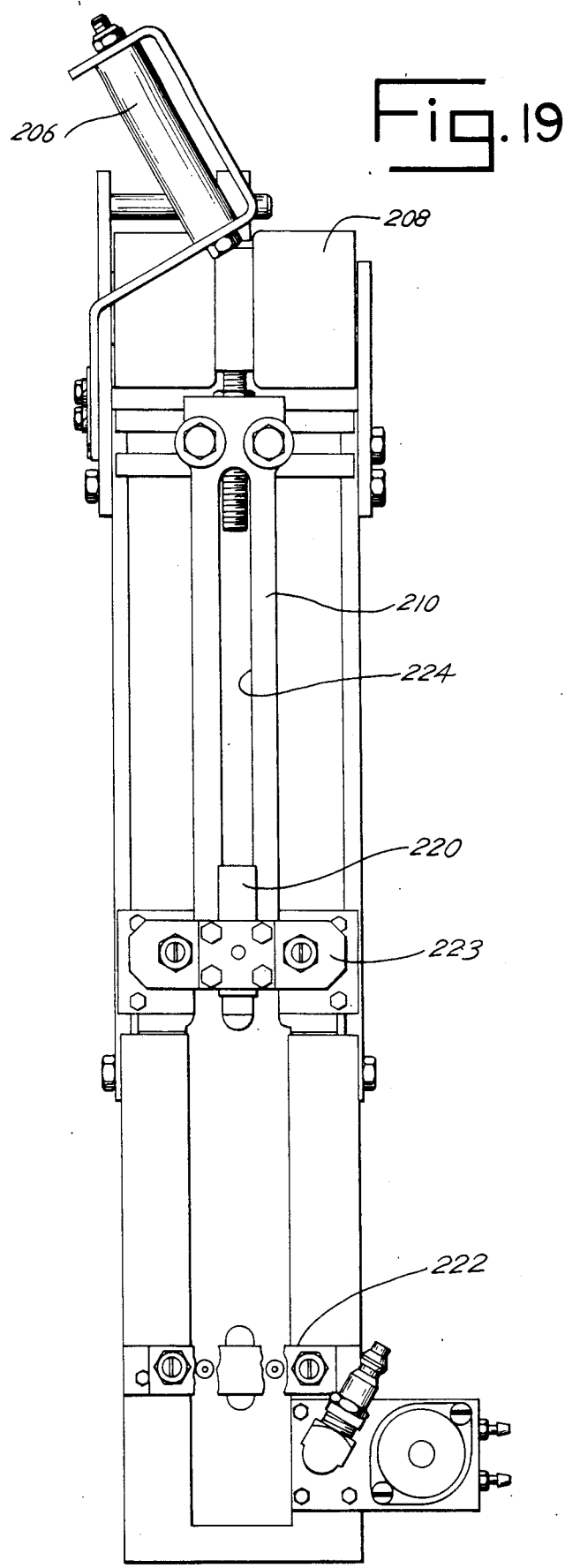
FIG. 19 is an end elevation view of a portion of the looper of the invention.

As shown in FIGS. 16 and 18, the knife 68 is positioned between the dies 192, 194. The knife is reciprocated by a pneumatic actuator 200, to sever the casing between two clipped ends of the casing.

Referring now to FIGS. 17 and 19-22, the looper 31 receives a continuous band of loops 202 from a loop tray 204. The loops are guided about guide rollers 206, 208 and into an elongated slot within a first loop guide 210. The band extends through the loop guide 210 and is directed into the path of a driven clip by a second, curved path loop guide 212. As the clip forms about the casing, the clip also forms about the loop end. A reciprocating loop knife 214 driven by a pneumatic cylinder 216 shears an end loop from the band of loops against a shear plate 218.

The loop band is fed through the looper by a loop pusher 220 cooperating with a clamp 222. The loop pusher 220 is mounted on a slider 223, and positioned to extend into a cross slot 224 in the first loop guide to engage the loop band. The pusher 220 is spring biased out of engagement with the loop band. The slider 223 is pneumatically, intermittently reciprocable along the first loop guide, and the clamp 222 is intermittently, pneumatic drivable to clamp the loop band. The pusher 220 is pneumatically actuable to engage the loop band.

The clamp 22, slider 223 and pusher 220 are operatively coordinated. The clamp maintains the position of the band during clipping and shearing while the slider is idle and near the clamp. The clamp also maintains the position of the band while the slider is then driven to be remote from the clamp, and the pusher actuated to engage the band. The clamp then releases, allowing the pusher and slider to advance the loop band as the slider reciprocates toward the clamp.

The action of the looper 31 is coordinated with the action of the clipper 30, the voider assembly 34, and the casing brake 32.

The preferred embodiment is now described. The preferred embodiment constitutes the best mode contemplated by the inventors of carrying out the invention.

The invention, and the manner and process of making and using it, have been described in full, clear, concise and exact terms to enable any person skilled in the art to make and use the same. Because the invention may be copied without the copying of the precise details of the preferred embodiment, the following claims particularly point out and distinctly claim the subject matter which the inventors regard as their invention and wish to protect.

What is claimed is:

1. In apparatus for stuffing a casing with a sausage material, said apparatus of the type including a mounting assembly, a hollow stuffing horn for discharge of sausage material, said horn supported by the assembly, said horn defining a substantially cylindrical, constant outside diameter tube for receipt of shirred casing; said apparatus also including a clipper apparatus positioned on the mounting assembly axially with respect to the discharge end of the stuffing horn for application of clips to close casing from the horn; the improvement comprising:
    enlarged discharge tube means-for controlling the release of casing from the tube, said enlarged means including an enlarged diameter outside end portion of the tube fixed at the discharge end of said tube said end diameter enlarged relative to the outside diameter remainder of the tube;
    an axially translatable brake assembly supported by the mounting assembly and encircling the tube and casing on the tube, said brake assembly positioned over the tube adjacent the enlarged diameter outside end and upstream from the outside end;
    said brake assembly including an inwardly projecting, flexible ring member positioned for braking engagement with the casing whenever the brake assembly is axially positioned to align the ring member over the enlarged diameter outside end portion of the tube, and positioned for disengagement from braking of the casing whenever otherwise axially positioned upstream from the end and over the tube; and
    means for axially positioning and maintaining the brake assembly over the tube and casing thereon by moving the assembly along the length of the tube toward and away from the enlarged end portion of the tube and for retarding withdrawal of casing from the enlarged end portion by compression between the ring and outside end as the ring is moved toward the outside end.

2. The improvement of claim 1 wherein the brake assembly comprises a forward, first brake member having a circular passage, said passage defining a frusto-conical seat, and a second brake member cooperative with the first brake member to retain the ring member against the seat.

3. The improvement of claim 2 wherein the first brake member is non-rotatable and said second brake member is axially adjustable with respect to the first brake member to apply adjustable force to the ring member for retaining the ring member on the frusto-conical seat and positioning the ring member against the casing.

4. The improvement of claim 3 wherein the second brake member is threadably engaged with the first brake member and rotatable with respect thereto.

5. The improvement of claim 2 wherein the reduced diameter of the frusto conical seat is positioned axially toward the direction of casing discharge from the tube.

6. The improved apparatus of claim 1 wherein the means for axially positioning the brake assembly include at least one mounting rod extending parallel to the tube and a first brake member slidably mounted on the rod, said first brake member supporting the flexible ring member, said first brake member cooperative with means for slidably driving the first brake member on the rod.

7. The improvement of claim 4 wherein the second brake member defines an external gear rotatable about the axis of the tube, and also including external gear means cooperative with the second brake means to rotatably adjust the engagement of said first and second brake members.

8. The improvement of claim 7 including gathering means adjacent the end of the tube for gathering the casing removed from the end before clipping by the clipper apparatus.

9. The improvement of claim 7 including voiding means adjacent the end of the tube for substantially gathering and voiding some of the casing before clipping by the clipping apparatus.

10. Apparatus as in claim 9 in which the voiding means includes two pairs of voider plates, and plate mounting means for pivotably mounting each pair of voider plates about an axis for movement toward and away from a position of at least close gathering of the casing, the plate mounting means further including means for moving the pairs of voider plates axially toward and away from each other, the plate mounting means also including means for pivoting of the voider plates of each pair of voider plates to and from a position of close gathering.

* * * * *